May 19, 1964

J. L. E. MORELLE 3,133,487

AUTOMATIC DIAPHRAGM PRE-SELECTOR FOR
REFLEX PHOTOGRAPHIC APPARATUS

Filed Sept. 20, 1960

INVENTOR.
Jules Louis Eugene Morelle

BY Michael S. Striker 3,133,487
AUTOMATIC DIAPHRAGM PRE-SELECTOR FOR REFLEX PHOTOGRAPHIC APPARATUS
Jules Louis Eugène Morelle, Paris, France, assignor to Optique & Precision de Levallois Chaptal, Levallois-Perret, France, a company of France
Filed Sept. 20, 1960, Ser. No. 57,194
Claims priority, application France May 13, 1960
3 Claims. (Cl. 95—64)

The use of reflux photograpic apparatus calls for a wide opening of the diaphragm during view-finding, as well as a rapid return to the position determined by the requirements of the exposure. Different methods of construction are well known, which make use of the shutter-release to trip a diaphragm pre-selection device which is previously set by hand.

The present invention has for its object to obtain an entirely automatic pre-selection of the diaphragm without any preliminary setting. To this end, the diaphgram is normally held wide open and only provides the small aperture necessary for the exposure under the action of a push-rod, which can be the same as that operated by the operator's finger to release the shutter unit, or any other member coupled by a kinematic system to this latter. The control of the position of the iris is effected by means of a slide of helicoidal shape, coupled for rotation with its mounting and controlled by a stud having a circular displacement (or a linear displacement for example) which is rigidly fixed to the casing. A device which is incorporated in the index giving the reference of the aperture used nevertheless permits the diaphragm to be used also in the usual manner.

The description which follows below with reference to the accompanying drawings (which are given by way of example only, and not in any sense by way of limitation) will clearly explain the different features of the invention and the manner in which they are carried into effect, any arrangement which is brought out either in the text or in the drawings being understood to fall within the scope of the present invention.

Figure 1:
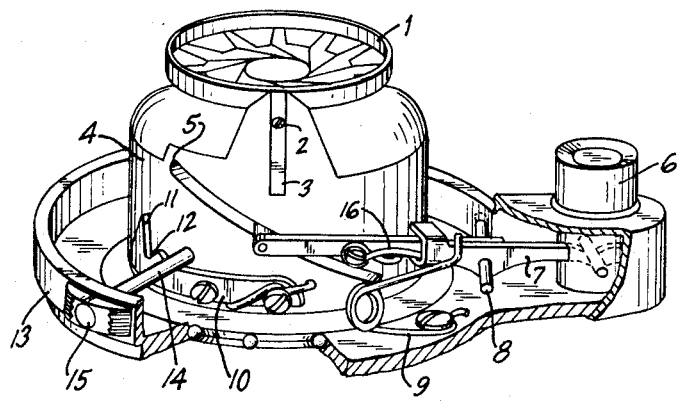
FIG. 1 illustrates the pre-selector operated by an external push-button.

In the two forms of embodiment illustrated, the ring 1 which acts on the leaves of the diaphgram is anchored by means of the stud 2 engaged in the slot 3 of the moving ring 4.

The moving ring 4 is mounted on a ball bearing and is provided with a helicoidal slot 5.

In a first form of embodiment shown in FIG. 1, the pressure applied to the push-button 6 and re-transmitted by the lever 7 which is pivotally mounted on the shaft 8, imparts to the moving ring 4, through the intermediary of the helicoidal slot 5, the rotary movement necessary for the closure of the diaphgram. As soon as the pressure is no longer applied, the spring 9 brings back the lever and the moving ring to their initial position, thereby setting the diaphgram to its fully-open position.

On the moving ring 4 is fixed the member 10, constituted by a stop-boss 11 and a notch 12 serving as a catch.

The ring 13, on which the values of the diaphgram settings are engraved, is provided with a stopping pin 14 which pre-determines the selected aperture; moreover, this pin, which is rigidly fixed to the knob 15 but which is eccentric with respect to this latter, can, by virtue of the rotation of the said knob on its own axis, move into a lower position on the drawing, thereby permitting its engagement in the groove 12 by virtue of its movement in front of the reference marks. The same result can be obtained for example, by displacement of the knob 15 and of the pin 14 parallel to this latter, or by translation of the same unit in a direction parallel to the groove 3. The ring 13 and the moving ring 4 being in that case rigidly fixed to each other, the effect of pre-selection is thus eliminated, the diaphgram can be operated in the usual manner (for estimating depth of field, for example); but when the aperture has been selected, it is only necessary to restore the knob 15 to its initial position by rotating it about its own axis, in order to revert to the fully-open position of the diaphgram, while still retaining the pre-selected closure setting for taking the picture.

The lever 7, which is pivotally mounted in two parts on its shaft 8, is held in line by the spring 16; this articulation permits the push-button 6 to move over its full distance of travel when the moving ring 4 is stopped by the pre-selective abutment at a value which is reached before it completes its maximum distance of travel.

The length of the slot 3 is determined by the extent of the displacement required by focussing the optical system.

In the drawings, the moving members are shown at approximately half the distance of their total travel.

Figure 2:
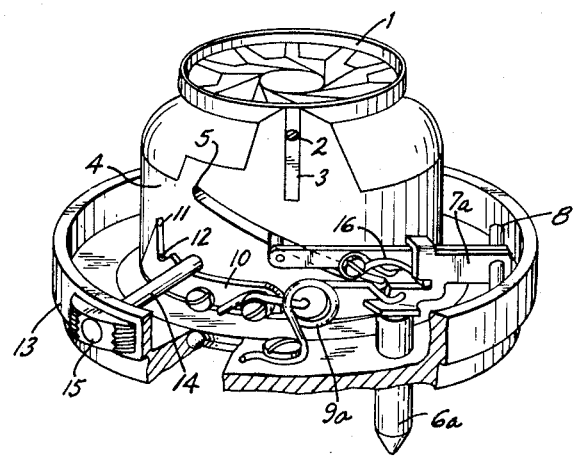
FIG. 2 shows an alternative form in which the control of the said pre-selector is coupled to an internal push-rod.

In an alternative form of embodiment shown in FIG. 2, the pre-selector is of the internally-controlled type. The push-rod 6a, which is shown in the drawing, forms an integral part of the body of the apparatus; it acts in the opposite direction on a lever 7a which is restored by the spring 9a and its action, which is controlled by a cam whose movement is directly associated with the displacement of the mirror and the shutter, gives a very high speed to the movements of the diaphgram.

Thus, with respect to the preselection and the elimination of the preselection of the diaphragm setting, it will be noted that the stop member 10 which has the stop projection 11 is fixed to the rotary ring 4 for turning movement therewith, while the stop member 14 is connected to the selecting ring 13 for turning movement therewith. Therefore, when the ring 13 is turned by the operator to select a certain aperture, the stop member 14 will be placed at a certain distance from the stop member 11 which in its rest position has a predetermined location corresponding to the largest size of the aperture of the diaphragm. Therefore, when the elements 6 or 6a are moved from their rest positions the ring 4 will be turned in that direction which reduces the size of the diaphragm aperture and the stop 11 will approach the stop 14 and will engage the latter when the ring 1 has turned with the ring 4 through an angle which provides the selected aperture. Further turning of the ring 1 together with the ring 4 will be prevented by the engagement of the stop member 14 with the stop member 11. In the usual position of the stop 14 it simply passes over the notch 12 which has nothing whatever to do with the preselection. The entire preselection is made simply by turning the ring 13 so as to determine the position of the stop member 14, and the stop member 11 can move freely up to the stop member 14 so as to provide the preselected aperture.

The notch 12 only comes into play when it is desired to eliminate preselection. Thus, the knob 15 may have a certain turning axis and the elongated stop pin 14 has an eccentric position with respect to this axis. Therefore when the knob 15 is turned it is possible for the operator to move the pin 14 into the notch 12 to provide a releasable connection between the ring 13 and the diaphragm-actuating ring 4. Thus, with the pin 14 in the notch 12 the elements 13 and 4 will necessarily turn together, and in this way it is possible for the operator to set the diaphragm in the usual, purely manual manner simply by turning the ring 13. When it is desired to again reestablish the preselecting feature of the invention, the operator simply returns the knob 15 to its original position which will of course move the pin 14 out of the notch 12, and in this way it will again be possible for the operator to turn the ring 13 independently of the diaphragm-actuating means 4 so that the operator can position the pin 14 according to the preselected aperture of the diaphragm.

What is claimed is:

1. A diaphragm assembly comprising, in combination, a diaphragm; rotary diaphragm-actuating means operatively connected to said diaphragm for adjusting the aperture provided by said diaphragm; rotary selecting means coaxial with said rotary diaphragm-actuating means and turnable for selecting an aperture to be provided by said diaphragm; a control member having a rest position and movable in a predetermined direction from said rest position; transmission means actuated by movement of said control member from said rest position thereof and cooperating with said rotary diaphragm-actuating means for turning the latter in a direction which reduces the size of the aperture provided by said diaphragm during movement of said control member from said rest position thereof; spring means cooperating with said transmission means for urging the latter in a direction which urges said control member to said rest position thereof and said rotary diaphragm-actuating means in a direction which provides the largest aperture of said diaphragm; a first stop member fixed to said rotary diaphragm-actuating means for turning movement therewith; a second stop member carried by said rotary selecting means and located in the path of movement of said first stop member during turning of said rotary diaphragm-actuating means in a direction which reduces the size of the diaphragm aperture, said selecting means placing said second stop member at a preselected distance from said first stop member when said diaphragm provides its largest aperture, whereby when said control member moves from said rest position thereof said transmission means will act on said rotary diaphragm-actuating means to turn the latter until said first stop member engages said second stop member so as to provide the preselected aperture while when said control member is returned to its rest position said transmission means will act on said diaphragm-actuating means to return said diaphragm to its largest aperture and to turn said first stop member away from said second stop member; and means for releasably connecting said second stop member with said rotary diaphragm actuating means at the will of the operator so that when said second stop member is thus connected with said rotary diaphragm actuating means the latter will turn with said selecting means to provide manual operation of the diaphragm.

2. A diaphragm assembly comprising, in combination, a diaphragm; rotary diaphragm-actuating means operatively connected to said diaphragm for adjusting the aperture provided by said diaphragm; rotary selecting means coaxial with said rotary diaphragm-actuating means and turnable for selecting an aperture to be provided by said diaphragm; a control member having a rest position and movable in a predetermined direction from said rest position; transmission means actuated by movement of said control member from said rest position thereof and cooperating with said rotary diaphragm actuating means for turning the latter in a direction which reduces the size of the aperture provided by said diaphragm during movement of said control member from said rest position thereof; spring means cooperating with said transmission means for urging the latter in a direction which urges said control member to said rest position thereof and said rotary diaphragm-actuating means in a direction which provides the largest aperture of said diaphragm; a first stop member fixed to said rotary diaphragm-actuating means for turning movement therewith; a second stop member carried by said rotary selecting means and located in the path of movement of said first stop member during turning of said rotary diaphragm-actuating means in a direction which reduces the size of the diaphragm aperture, said selecting means placing said second stop member at a preselected distance from said first stop member when said diaphragm provides its largest aperture, whereby when said control member moves from said rest position thereof said transmission means will act on said rotary diaphragm-actuating means to turn the latter until said first stop member engages said second stop member so as to provide the preselected aperture while when said control member is returned to its rest position said transmission means will act on said diaphragm-actuating means to return said diaphragm to its largest aperture and to turn said first stop member away from said second stop member; and means for releasably connecting said second stop member with said rotary diaphragm actuating means at the will of the operator so that when said second stop member is thus connected with said rotary diaphragm actuating means the latter will turn with said selecting means to provide manual operation of the diaphragm, said means for releasably connecting said second stop member with said rotary diaphragm-actuating means including a portion of said rotary diaphragm-actuating means formed with a cutout and means connected to said second stop member for placing the latter at the option of the operator in said cutout to provide the connection between said rotary diaphragm-actuating means and said selecting means and for removing said second stop member from said cutout to disconnect said selecting means and diaphragm-actuating means from each other to reestablish the cooperation between said first stop member and said second stop member.

3. A diaphragm assembly comprising, in combination, a diaphragm; rotary diaphragm-actuating means operatively connected to said diaphragm for adjusting the aperture provided by said diaphragm; rotary selecting means coaxial with said rotary diaphragm-actuating means and turnable for selecting an aperture to be provided by said diaphragm; a control member having a rest position and movable in a predetermined direction from said rest position; transmission means actuated by movement of said control member from said rest position thereof and cooperating with said rotary diaphragm-actuating means for turning the latter in a direction which reduces the size of the aperture provided by said diaphragm during movement of said control member from said rest position thereof; spring means cooperating with said transmission means for urging the latter in a direction which urges said control member to said rest position thereof and said rotary diaphragm-actuating means in a direction which provides the largest aperture of said diaphragm; a first stop member fixed to said rotary diaphragm-actuating means for turning movement therewith; a second stop member carried by said rotary selecting means and located in the path of movement of said first stop member during turning of said rotary diaphragm-actuating means in a direction which reduces the size of the diaphragm aperture, said selecting means placing said second stop member at a preselected distance from said first stop member when said diaphragm provides its largest aperture, whereby when said control member moves from said rest position thereof said transmission means will act on said rotary diaphragm-actuating means to turn the latter until said first stop member engages said second stop member so as to provide the preselected aperture while when said control member is returned to its rest position said transmission means will act on said diaphragm-actuating means to return said diaphragm to its largest aperture and to turn said first stop member away from said second stop member; and means for releasably connecting said second stop member with said rotary diaphragm-actuating means at the will of the operator so that when said second stop member is thus connected with said rotary diaphragm-actuating means the latter will turn with said selecting means to provide manual operation of the diaphragm, said means for releasably connecting said second stop member to said rotary diaphragm-actuating means including a portion of said diaphragm-actuating means formed with a notch and connected with said first stop member and means connected to said second stop member for optionally placing the latter in said notch.

References Cited in the file of this patent

UNITED STATES PATENTS

| | | |
|---|---|---|
| 2,803,182 | Werner | Aug. 20, 1957 |
| 2,845,013 | Schutz | July 29, 1958 |
| 2,981,169 | Schutz | Apr. 25, 1961 |

FOREIGN PATENTS

| | | |
|---|---|---|
| 108,458 | Great Britain | Jan. 17, 1918 |